United States Patent [19]
Mount

[11] Patent Number: 5,321,415
[45] Date of Patent: Jun. 14, 1994

[54] OPTICAL DISPLAY OF VEHICLE SPEED

[76] Inventor: Wilbur S. Mount, 5806 College Creek Pl., Williamsburg, Va. 23185

[21] Appl. No.: 685,071

[22] Filed: Apr. 15, 1991

[51] Int. Cl.⁵ .......................... G09G 3/00; B60Q 1/00
[52] U.S. Cl. ......................................... 345/7; 340/441; 340/980
[58] Field of Search ............... 340/705, 980, 753, 754, 340/461, 466, 958, 722, 441; 358/103; 359/630, 439; 362/23, 26-29; 353/13, 14; 345/7-9, 35-40, 140

[56] References Cited

U.S. PATENT DOCUMENTS

| | | | |
|---|---|---|---|
| 3,125,985 | 3/1964 | Nallinger | 73/519 |
| 3,317,906 | 5/1967 | Baldridge | 340/705 |
| 3,694,084 | 9/1972 | Citron | 356/25 |
| 3,899,241 | 8/1975 | Malobicky, Jr. et al. | 353/14 |
| 4,251,769 | 2/1981 | Ewert et al. | 340/715 X |
| 4,646,059 | 2/1987 | Iwamoto et al. | 340/461 |
| 4,688,029 | 8/1987 | Kawasaki et al. | 340/754 |

FOREIGN PATENT DOCUMENTS 899009 12/1953 Fed. Rep. of Germany ........ 353/14

*Primary Examiner*—Jeffery Brier
*Attorney, Agent, or Firm*—Stevens, Davis, Miller & Mosher

[57] ABSTRACT

An optical display of vehicle speed wherein a series of diodes is mounted in an optical speed display assembly to project a series of lights onto a windshield such that the reflections can be seen without changing the focus of the operator as the operator is operating the vehicle. By means of such reflections an operator can determine the speed of the vehicle while maintaining the focus of his eyes on the roadway.

16 Claims, 2 Drawing Sheets

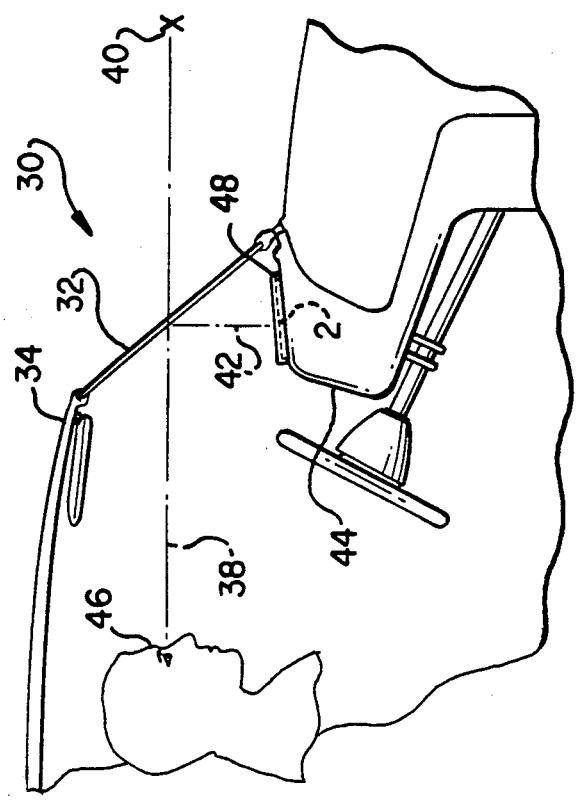
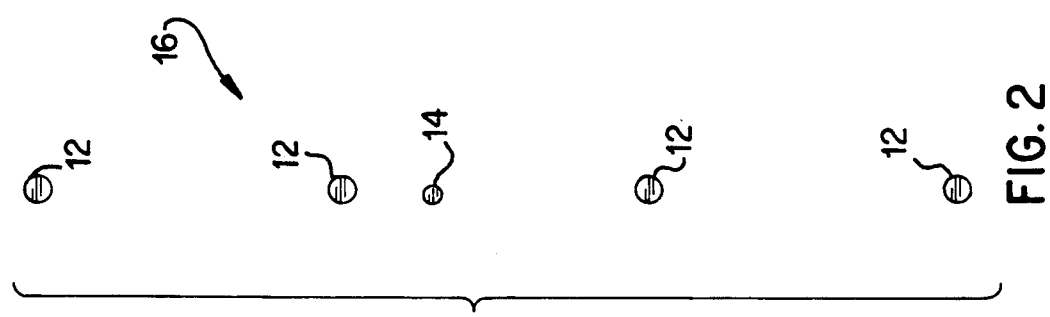
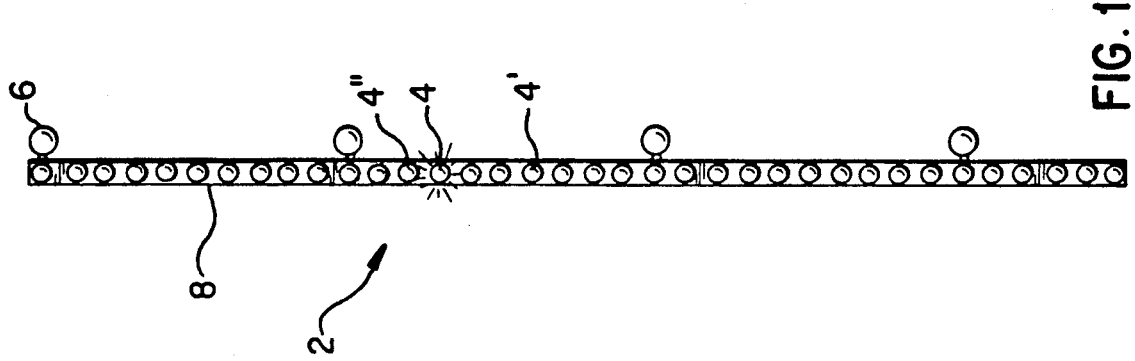

OPTICAL DISPLAY OF VEHICLE SPEED

BACKGROUND OF THE INVENTION

The present invention relates to a display device which is projected onto the windshield of a vehicle. The driver of the vehicle can accurately and unambiguously determine the speed of the vehicle from the projected image on the windshield.

DESCRIPTION OF RELATED ART

U.S. Pat. No. 2,264,044 to Lee discloses a motor vehicle speedometer that is so arranged and mounted that a driver is apprised of the vehicle speed; numerals representing the vehicle speed are projected as transparent images onto the windshield directly in front of the driver by means of reflected light.

U.S. Pat. No. 2,514,619 to Anderson discloses a stroboscopic apparatus which utilizes the wave guide properties of certain plastics for visible light and which enables one to distribute a beam of light throughout the circumference of a ring and to view a spot of light through an aperture in a rotating disk, the aperture being disposed in front of the plastic element in such a way as to provide stroboscopic indications.

U.S. Pat. No. 2,641,159 to Mihalkas discloses that a conventional supporting base has a socket with a circuit wire and which supports a six volt lamp, readily accessible for replacement, and light radiated from a lamp bulb of the lamp is condensed by a condenser lens and projected to a mirror which, in turn, reflects the image through a window and a lens combination. The image next transverses an assembly tube through a dust proof window to a surface of a reflecting screen on a windshield window surface.

U.S. Pat. No. 3,125,985 to Nallinger discloses a small guide or receiving member for a movable indicator mark, possibly moving rectilinearly by means of a suitable support or carrier and by accommodating a drive for this indicator mark or the support thereof in a manner invisible to the driver within the enclosure or frame of a window pane. A construction is thereby preferred in which the indicator mark is moveable, possibly by means of the support thereof in an essentially vertical manner within the field of vision of the driver.

U.S. Pat. No. 3,317,906 to Baldridge discloses an apparatus attained by interposing a plastic interlayer and instrument indicator means between a pair of pellucid panels. The instrument indicator means, in general, refers to the type of indicators normally located on vehicular dash panels.

U.S Pat. No. 3,694,084 to Citron discloses a pulsating signal which may be a direct beam of pulsating light emanating from a first moving aircraft or from a fixed station, the beam of pulsating light being directed upon a rotating transparent disk located in a second aircraft, the transparent disk being positioned whereby a pilot can observe or view through the disk while maintaining his vision through the windshield of the aircraft. Thus, if markings on the disk or the image appear to be stationary the pilot will know that the air speed of his aircraft is equal to the air speed of the aircraft being followed. Should the markings or image appear to be moving forwards or backwards the pilot will increase or decrease his airspeed respectively, in order to render the markings or image stationary and thereby equalize his airspeed with respect to the airspeed of the other aircraft.

U.S. Pat. No. 4,621,306 to Sell discloses that a display field is provided on a side facing away from an observer, and wherein there is disposed in front of the display field an optical light dash guide plate of transparent material in which light scattering particles are distributed and into which light can be introduced from a source of light. Depending on existing lighting conditions, readability can be obtained with the light passing through the display field from the side facing away from the observer or with the light from the source of light.

U.S. Pat. No. 4,635,033 to Inukai et al. discloses a display system wherein a mirror plate is arranged to visually display instantaneous information of an indicator to a driver selectively in a frame of the instrument panel or on the internal surface of a front windshield without any decrease of the luminosity of rays representative of the information.

U.S. Pat. No. 4,636,782 to Nakamura et al. discloses a display arrangement which is capable of displaying information perspectively or three dimensionally in a vehicle instrument panel.

U.S. Pat. No. 4,723,840 to Humbert et al. discloses a device which is used in front of a windshield of a motor vehicle; thus, substantially horizontal light rays coming from outside the vehicle pass through the transparent material without being stopped by opaque flaps thus allowing, in the daytime, a display overprinted on the landscape; by night, a part of the light from a light source, which is reflected from the sheet of transparent material illuminates a wafer without the risk of dazzling, and the unreflected part of this latter, directed substantially vertically, is stopped by opaque flaps and remains confined inside the device so as not to diffuse in a passing space.

U.K. Patent No. 364,863 to Heronimos discloses an indicator for determining the relative speeds between two relatively rotatable members comprising a shutter range driven by one of the members and an indicator member, viewable through such shutter, and arranged to be driven by the other member, which shutter and indicator member are provided with one or more series of so called co-operating "apertures" and indicating marks, whereby at different predetermined relative speeds of rotating members, the indicating marks, in a different series, appear to remain stationary.

A *Business Week* article entitled *G.M.and Hughes: Is the Marriace Fizzling?*, of Feb. 12, 1990 discloses a fighter type "heads up display" that projects numerals indicating a motor vehicle'speed on the windshield of some Oldsmobile and Pontiac models.

The above references fail to disclose a display system which can be accurately and unambiguously viewed by the vehicle operator while looking at the road ahead or by glancing quickly at the windshield. The prior art discloses a display system for which the operator must divert his attention for an unsafe period of time from the roadway in order to view the display system.

Previous designs of display systems to show vehicle speed along the forward line of vision have been deficient because of the operator's need to focus his view on numerals or other speed images of the speed indicator. Failure to specifically focus the eyes on the windshield may create two images. Each image corresponds to an eye of the operator, and each image is spaced apart from the other. Thus, two images would have been apparent when the eyes of the operator are focused well ahead of the vehicle as is usual during safe operation of the vehicle. Images containing words, letters, numbers and diagrams are confusing, especially when the two images overlap.

Thus, the need continues for a speed indicator for motor vehicles which is readily discernable by the vehicle operator without the need to focus the operator's eyes specifically on the speed indicator. The present invention has been developed to overcome the problems of the prior art.

The above references are incorporated by reference herein.

OBJECT OF THE INVENTION

For safer driving at today's high speeds, there is a need for continuous observation of the speed of the vehicle without the diversion of attention from the roadway to view the speedometer, which is usually located on the dashboard of the vehicle. More particularly, the length of time required to change a driver's focus point from the roadway to the dashboard speedometer and back from the speedometer to the roadway can be considerable. If a vehicle were traveling at 60 miles an hour and if a young healthy vehicle driver requires one second to change his focus point, the driver's vehicle travels 88 feet in that one second. However, if the vehicle driver is hyperopic, is middle aged or older, or if he suffers from diseases of the eye affecting focus, the length of time for these drivers to change their focus from the roadway to the speed indicator and back to the roadway can significantly increase; and in some individuals, this length of time can be as long as several seconds. If the vehicle were traveling at 60 miles an hour, an amount of only three seconds without the operator's eyes being focused on the roadway translates into 264 feet in which the vehicle has traveled; this distance is sufficiently long that a second vehicle, an animal or a small child could have entered the vehicle's path. Additionally, the repetition of changing a person's eye focus from the roadway to the speed indicator and back to the roadway can lead to eye fatigue which may diminish the safe operation of the vehicle. Thus, an object of the invention is to improve the safety of motor vehicles by providing an apparatus which allows the vehicle speed to be monitored without the necessity to change the eye focus of the operator from the roadway or by a quick glance at the windshield. The objective permits a continuous or near continuous observation of the roadway with the speed image being in the field of view of the operator without diverting the operator's attention from the roadway.

SUMMARY OF THE INVENTION

I have invented a novel apparatus including a display system for use in a vehicle, the vehicle being driven by an operator. As the operator has an optical focus point which is changeable, the display system for avoiding the necessity for the operator to refocus his eyes from the roadway to view the speed of the vehicle includes: a screen for the projection of a vehicle speed indicia, the screen being at least partially transparent; projecting means for generating at least one light source to indicate an actual speed of the vehicle and at least one scale to indicate a range of predetermined speeds and means for projecting the at least one light source and the at least one scale onto the screen to generate a light projection; wherein the light projection corresponds to the actual speed and the light projection is readable by the operator without focusing his optical focus point on the speed indicator.

This simplicity of the image; that is, no letters, numbers, words, or diagrams, i.e., a mere arrangement of lights to indicate vehicle speed, arranged in a pattern that is easy to read and is suitable for placement near the operator's forward line of sight assures that no interference with forward vision occurs. The present invention enables the operator of the vehicle to keep track of speed continuously while concentrating on the road ahead and without the strain or fatigue involved in repetitive changes of eye focus to read the instrument panel. Reduced fatigue is a great plus for safety. Because of the simplicity and clarity of the image, speed can be determined by the operator without removing his eye focus from the road ahead, or, alternatively, the speed can be seen in a quick sideways glance. Either procedure avoids the time consuming and unsafe concentration normally needed to read the speedometer. In the present invention the arrangement of the light source forms an image of vehicle speed to cover a desired range of speeds without necessarily including words, letters, numbers or diagrams which would necessitate re-focussing of the operator's eyes on the indicia imparting the speed information.

The narrow vertical design of the speed indicator means of the present invention does not cause overlap images and eliminates the confusion caused by prior art devices even if two images are seen.

BRIEF DESCRIPTION OF THE DRAWINGS

FIG. 1 is a top view of the optical display showing a series of lamps of the optical display;

FIG. 2 is a view along an operator's line of sight toward a roadway showing a reflection of the lamps on the windshield from an optical display according to the present invention;

FIG. 3 is a sectional side view of the inside of the vehicle;

DETAILED DESCRIPTION OF THE PREFERRED EMBODIMENTS OF THE INVENTION

Figure 4:
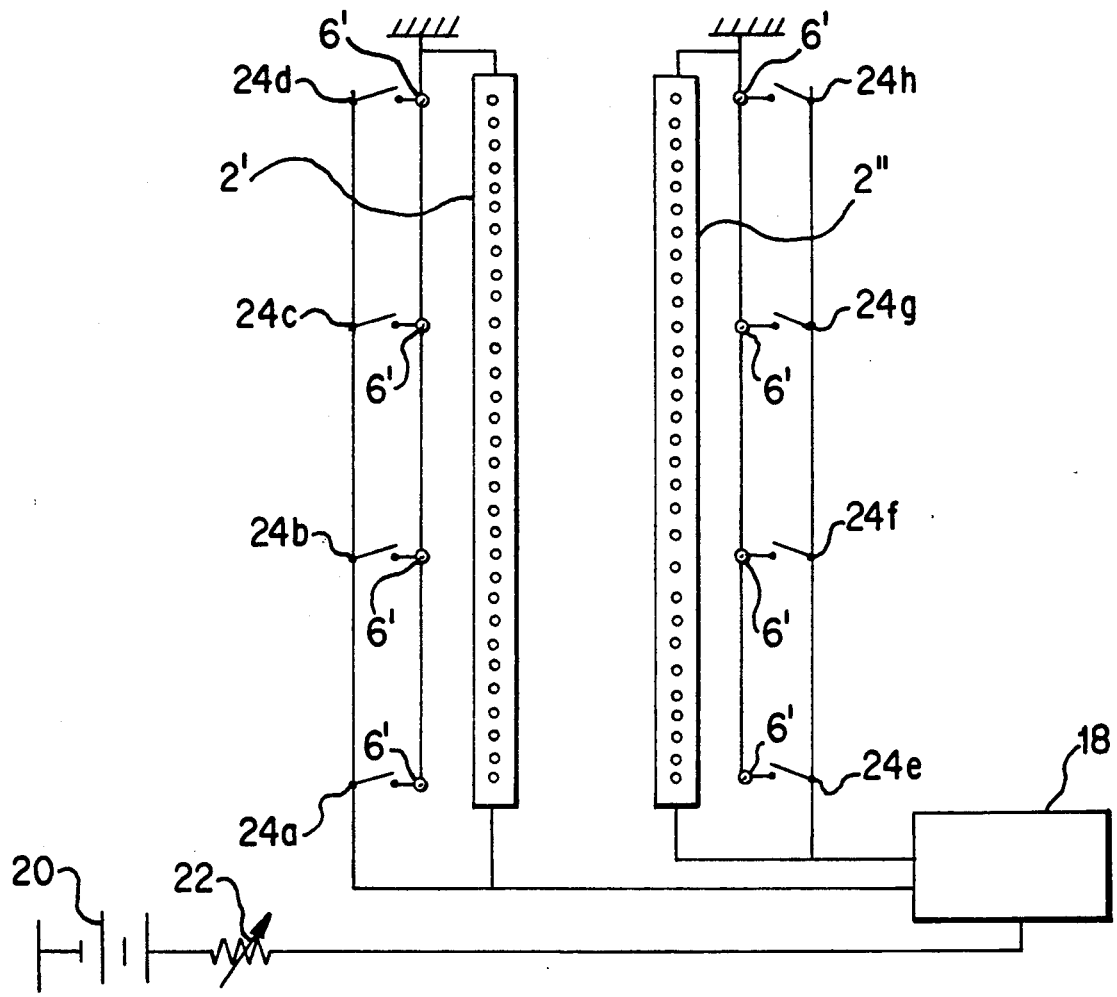
FIG. 4 is a schematic, top view of an alternative embodiment of the optical display shown in FIG. 1.

As shown in FIG. 1, and in a particular preferred embodiment of the invention, an optical speed display assembly 2 is mounted horizontally on the upper surface of the instrument panel. In one embodiment a speed indicating assembly 8 is an elongate member shaped generally rectangularly, and the assembly 8 comprises a series of lamps 4 which are mounted and aligned in a column along the longitudinal direction of assembly 8. Lamps 4 are directed generally vertically and upwardly and project their beam 42 of light to the operator by a reflection formed from the windshield 32 of the vehicle. As is conventional the windshield 32 may be mounted at an oblique angle with respect to the line of sight of the operator and therefore with regard to assembly 2. In this particular embodiment, the longitudinal direction of the speed indicating assembly 8 is generally parallel to the line of sight 38 of operator 46, but assembly 8 could be mounted at any angle, including perpendicular, to the line of sight 38 of operator 46. The optical display of speed is low in cost and needs no new technology. It may be retrofitted to existing vehicles being used as a supplement or replacement for the original speed indicator. It may also be incorporated into newly manufactured vehicles as original equipment as a supplement for or replacement of heretofore known speed indicators.

In the foregoing embodiment, each of lamps 4 is indicative of a particular actual speed of the vehicle. In normal operation of this embodiment, only one lamp 4 is lit at any one time.

However, in an alternative embodiment, the invention includes the continuous, non-interrupted movement of the projected image of lamp 4. This could be accomplished in various ways, such as by the use of a lamp mounted to a fixture, which fixture pivots in relation to the actual vehicle speed thereby changing the position of the projected image. Alternative means could include reflecting means or light guides mounted for movement so as to alter the position of the projected light.

The vehicle speed could be converted to an electrical signal in a number of ways. In one embodiment, the actual vehicle speed could be measured electronically; actual speed could also be measured mechanically and transformed into an electrical signal. In either case, a first electronic signal from the vehicle drive system corresponds to a distance that the vehicle has traveled and a second electrical signal measures time, such as a signal generated by the oscillation from a crystal. These two signals are combined to generate a third electrical signal which indicates an increment of speed such as one mile per hour. As the speed changes the third electrical signal would correspondingly change. As a different increment of speed is reached by the vehicle, the third electrical signal would sufficiently change to extinguish one lamp and energize a second lamp. This process would be repeated as the speed of the vehicle changed continuously.

Of course, electrical power for the entire optical speed display assembly is generated from the vehicle's electric system 20. Lamp 4 could be any small, non-dazzling light source, such as liquid crystal, incandescent lamps, light emitting diodes or other illumination sources or may comprise the exit of light guides (not shown) illuminated by a source remote from assembly 8.

In FIG. 1, a reflection of optical display assembly 2 is seen by the operator of the vehicle when positioned inside the vehicle or mounted above the instrument panel. In this design of FIG. 1, lamps 4 are light emitting diodes which are embedded in a strip of plastic which is about a quarter of an inch wide; the light emitting diodes are placed apart from each other, and each of lamps 4 corresponds to a different speed; the difference in actual speed between adjacent light emitting diodes is a predetermined increment, i.e., one mile an hour. At the bottom of the optical speed display assembly 2 lamp 4 could represent 45 miles per hour and at the top of the optical speed assembly 2 lamp 4 could correspond to 80 miles per hour. It is realized, of course, that the range 45 miles per hour to 80 miles an hour is arbitrarily chosen. The need for a speed scale in this range is great because this speed range represents the speed range where the most distance is covered while the operator's eyes are not focused on the roadway. For lower speeds the conventional speedometer, which would remain in operation on the vehicle could be used. In other embodiments, the range represented by the lamps 4 from top to bottom of optical speed display assembly 2 could be varied to any range desired by the operator. The number of lamps 4 is arbitrary and could be any convenient number. Speed indicating assembly 8 could be formed of a plastic strip which is sufficiently deep enough, front to rear, to accommodate conductors for electric power to individually power each of a plurality of light-emitting diodes.

To determine speed, the actual speed must be referenced to a second line of lamps. As shown in FIG. 1, speed scale lamps 6 are mounted adjacent to the side of the speed indicating assembly 8; these speed scale lamps 6 correspond to specific vehicle speeds, for example speed scale lamps 6 from bottom to top correspond to 50, 60, 70 and 80 miles per hour. Speed scale lamps 6 are positioned in the same direction as lamps 4 to project the beam of lamp 6 to windshield 32. Speed scale lamps 6 project a speed scale on the windshield 32 to form reflection 12. If lamp 4 adjacent to a speed scale lamp 6 were lit, the actual vehicle speed would be the speed represented by speed scale lamp 6. To determine or to read the speed of the vehicle, for example, the operator knows that the position of the two speed scale lamps 6 in the center of optical speed assembly display 2 are for 60 and 70 miles per hour, respectively. In FIG. 1, the lamp 4 is illuminated between 60 and 70 miles per hour.

In FIG. 1, the reflection 14 of lamp 4 which is lit indicates that the vehicle has a speed of approximately 67 miles per hour.

The optical speed light assembly 2 may be lengthened or shortened, i.e., to include additional speed indicator lamps 4 or fewer speed scale lamps 6 for a different speed range. The spacing on the scale is variable and the invention permits the advantage of spacing the projected lights of the scale to distances spaced further apart than those found in the projecting unit. The optical speed display assembly 2 is purposely made light weight and somewhat fragile so as to yield readily during impact and thus preventing a hazard to the operator during impact.

FIG. 1 approximates the appearance of the optical speed display assembly 2 in daylight when mounted on the windshield or above the instrument panel. FIG. 2 approximates the appearance at night on the windshield or above the instrument panel. Specifically, in FIG. 2 lamp reflection 14 of lamps 4 is shown spaced between other adjacent reflections 12 to form a speed scale, and reflection 14 of speed indicating lamp 4 in combination with reflection 14 discloses or shows the actual speed of the vehicle relative to the speed scale. Of course, it is within the scope of the invention to vary the speed scale to include other gradations of speed, e.g., every five miles per hour.

The operator should know the speed corresponding to reflections 12. However, if the operator were to forget, a printed card (not shown) could be mounted on the instrument panel as a reminder.

FIG. 3 shows the optical speed display assembly 2 located horizontally above instrument panel 44; the beam 42 forms a reflection on windshield 32. Line of sight 38 of the operator 46 detects the reflection o the windshield 32 while the operator is viewing the focus point 40. Thus, the operator would be able to view the reflections on windshield 32 without changing his focus or with a slight sideways glance.

In a particular preferred embodiment, assembly 2 could be shielded from outside ambient light by recessing assembly 2 into the horizontal upper surface of the instrument panel 44 or alternatively by fitting assembly 2 with light shields (not shown) at edges 48 located on the upper surface of optical speed display assembly 2.

Thus, optical speed display assembly 2 would be protected from ambient light and would appear somewhat like that shown in FIG. 2. The intensity of the light could be varied manually or automatically so that the scale and speed indicator can be viewed in all light conditions. The use of a photometer could be used for automatic variation, while a dimmer 22 could be used for manual operation.

The operator 46 has a customary focus point 40 which may be a particular spot on the highway ahead of an operating vehicle; the operator is able, without drastically changing his focus from his customary focus point 40 to view the reflection of the projected optical speed display assembly 2 on windshield 32 directly or with a slight glance changing the focus point. Depending on the relative distance of the focus point 40 from the operator 46, the reflection of the assembly 2 may appear sightly blurred, but the information of the reflection would be readily discernable because the operator is not required to "read" the information as in prior art systems.

In this invention, actual vehicle speed is indicated by illumination of lamp 4 of speed indicating assembly 8. Lamp 4' is extinguished and another lamp 4 is energized and is seen to move stepwise up and down a narrow vertical path as the vehicle speed changes. In the preferred embodiment, the illumination from a light source, e.g., a lamp, is projected onto a windshield so as to provide an indication of actual vehicle speed. The effect of the movement is provided by a series of lamps spaced along the vertical path apart from each other by the next succeeding lamp. Each lamp represents a different speed, and the vehicle speed that is indicated increases stepwise from the bottom to the top of the display by one mile per hour. One lamp, e.g., lamp 4, is illuminated at one time; lamp 4 remains illuminated until the speed changes. When the speed changes, at that point, one lamp 4 is extinguished, and the next successive lamp 4' is illuminated and so on to lamp 4'. This process continues as long as the speed changes. Alternatively, the projection of lamp 4 could be made to simulate continuous movement as by pivoting lamp 4 about a pivot point in relation to the speed of the vehicle.

In either embodiment, at any one time, the determination of actual speed is made by reference to a second line of speed scale lamps 6 which are located parallel to and near the above speed indicator. Speed scale lamps 6 are in constant illumination and more widely spaced than the individual speed indicating lamps. Speed scale lamps 6 could be placed at 10 mile per hour increments or at any other convenient increment. To make speed scale lamps distinctive and contrasting with lamp 4, a different color or intensity lamp could be used. The illumination of five speed scale lamps 6 are sufficient to display a speed scale display 16 over a full range of speeds which a driver normally may encounter. Of course, the provision of fewer or additional lamps for either the speed scale or actual speed indicators are within the scope of the invention.

Reflection 12 and reflection 14 are easy to discern and because of the simplicity of the design; optical speed display assembly 2 may be placed alongside the operator's line of vision without interfering with the forward view of the operator.

Optical speed display assembly 2 could be attached to the inside of the windshield by adhesive, facing the operator, and in a position which best aids the operator. In this position, the optical speed display 2 is viewed directly by the operator of the vehicle.

Optical speed display assembly 2 could additionally be mounted between the windshield and the operator, in full view of the operator, on a mounting that would yield under impact during an accident. In this position, the preferable suspension of the assembly 2 would be by thin low strength cords. Speed indicating assembly 8 preferably is an elongated member which is ⅛ of an inch wide for most of the length and constructed to break apart readily so as to pose no safety hazard; and in a preferred embodiment, optical speed display assembly 2 could weigh as little as a few ounces.

In another embodiment, optical speed display assembly 2 could be mounted horizontally above the instrument panel; optical speed display assembly 2 would face upwards, and the beam of light would be reflected to the operator by a thin, flat, transparent surface (not shown).

In another embodiment, the longitudinal direction of the optical speed display assembly is front to back and parallel to the view of the operator 38. In this embodiment, the reflector or flat transparent surface (not shown) could be a thin transparent surface which could collapse harmlessly on impact in an accident.

In another embodiment, FIG. 4 two optical speed display assemblies 2', 2 could be provided; each of the optical speed display assemblies could be positioned so that each of the assemblies provide a refection on the windshield on both sides of the operator. In this embodiment two different speed ranges could be provided. One range of speeds assembly 2, being 1-40 mph, and the other range of speeds assembly being 41-80 mph. Additionally, a switch could be included to alternatively select either two different speed ranges as described above or a single speed range which has been described in other embodiments. Switches 24a-h could be utilized to select which of the speed scale lamps 6a-6h (FIG. 4) will be energized.

The windshield of the vehicle could be either partially transparent or totally transparent. The light source, the scale or both could be different colors, or the light source, the scale or both could flash or be of different intensity or wavelength for contrasting or distinctive appearance. It is preferable to tint the windshield in an area corresponding to the size and shape of assembly 8 so that the secondary reflections from the interface of the plastic layer between the glass surfaces of conventional windshield, or from the outer glass surface are minimized or avoided.

It is to be understood that speed is not the only parameter which could be projected onto the windshield. Other parameters such as oil pressure or gas mileage would be within the scope of the invention. It is also within the scope of the invention to include words, letters, numbers, diagrams, etc. in combination with the display system of the present invention.

Although the invention has been described in detail for the purpose of illustration, it is to be understood that such detail is solely for that purpose, and one skilled in the art can make variations therein without departing from the spirit and scope of the invention.

I claim:

1. A speed display system for use in a vehicle, intended to be operated by a sighted human operator, said operator having an optical focus point which is changeable, said display system comprising:

a screen for receiving a projection of a vehicle speed indicia, said screen being at least partially transparent;

generating means for generating a point of light to indicate an actual speed of said vehicle and generating means to generate at least one scale, which scale consists of one point of light to indicate a range of predetermined speeds and means for projecting said point of light to indicate an actual speed and said at least one scale onto said screen to generate a light display which is a series of discrete points of light;

wherein said light display is readable by said operator by comparing the point of light representing the actual speed of the vehicle to the point of light representing the scale while maintaining customary driving eye focus, or by a quick glance slightly to the side of the line of vision.

2. A speed display system for use in a vehicle, intended to be operated by a sighted human operator, said operator having an optical focus point which is changeable said display system comprising:

a screen for receiving a projection of a vehicle speed indicia, said screen being at least partially transparent;

generating means for generating a point of light to indicate an actual speed of said vehicle and generating means to generate at least one scale, wherein said scale consists of only one point of light to indicate a predetermined speed and means for projecting said at least one point of light to indicate an actual speed and said at least one scale onto said screen to generate a light display which is a series of discrete points of light;

wherein said light display is readable by said operator by comparing the point of light representing the actual speed of the vehicle to the point of light representing the scale while maintaining customary driving eye focus, or by a quick glance slightly to the side of the line of vision.

3. A display device as in claim 2 wherein the light source is a non-dazzling light source.

4. A display system as in claim 3 wherein said non dazzling light source is an incandescent bulb.

5. A display system as in claim 3 wherein said non dazzling light source is a light emitting diode.

6. A display system as in claim 2 wherein said means for projecting includes a source reflection which corresponds to said point of light indicating an actual vehicle speed and a scale reflection which corresponds to said point of light indicating said scale, said source reflection moving relative to said scale reflection as said actual vehicle speed changes by one predetermined speed increment.

7. A speed display as in claim 2 wherein the speed display is arranged on one side of said screen.

8. A display system as in claim 2 wherein said point of light indicating an actual vehicle speed and said point of light indicating said scale are different colors.

9. A display system as in claim 2 wherein either of said point of light indicating an actual vehicle speed or said point of light indicating said scale flashes for distinctive and contrasting appearance.

10. A display system as in claim 2 wherein said display system includes a mounting, said mounting attaching said display system to said vehicle, said mounting yielding during impact.

11. A display system as in claim 2, said display system being mounted horizontally above the instrument panel of the vehicle, said display system including a surface, said surface being transparent to reflect said point of light indicating an actual vehicle speed and said point of light indicating said scale to said operator.

12. A display system as in claim 11, wherein said surface being a thin film of plastic, said surface being collapsible under impact.

13. A display system as in claim 2, wherein said projection means comprises the end of a light guide, said light guide being illuminated by means remote from said projection means.

14. A display system as in claim 2 wherein said screen is a windshield, said windshield tinted on a first surface facing the operator in a narrow vertical area, said light display being projected onto said narrow vertical area to increase reflection of the light display, and to minimize such reflection from the surfaces of the windshield plastic layer interface.

15. The speed display system according to claim 14 including means for selecting an alternative speed scale.

16. A speed display system for use in a vehicle, intended to be operated by a sighted human operator, said operator having an optical focus point which is changeable, said display system comprising:

a screen for receiving a projection of a vehicle speed indicia, said screen being at least partially transparent;

generating means for generating a single point of light to indicate an actual speed of said vehicle and generating means for generating at least one speed scale, while scale consists of one point of light, to indicate a predetermined speed and means for projecting said single point of light and said at least one scale onto said screen to generate a light display; and means for selecting an alternative speed scale;

wherein said light display is readable by said operator by comparing the point of light representing the actual speed of the vehicle to the point of light representing the scale while maintaining customary driving eye focus, or by a quick glance slightly to the side of the line of vision.

* * * * *